United States Patent Office 3,091,610
Patented May 28, 1963

3,091,610
SULFA COMPOUNDS AND PROCESSES
Hermann Bretschneider and Wilhelm Klötzer, Innsbruck, Austria, assignors to Hoffmann-La Roche Inc., Nutley, N.J., a corporation of New Jersey
No Drawing. Filed Nov. 8, 1960, Ser. No. 67,879
Claims priority, application Switzerland Nov. 18, 1959
8 Claims. (Cl. 260—239.75)

This invention relates to novel chemical compounds and to novel chemical processes. More particularly, the product aspect of the invention relates to novel chemical compounds which can be represented collectively by the formula (I)
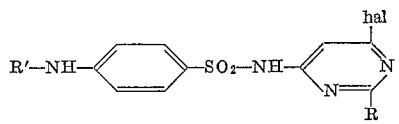

wherein the symbol hal represents halogen (preferably chlorine or bromine); the symbol R represents halogen (preferably chlorine or bromine) or alkoxy (preferably lower alkoxy, such as methoxy or ethoxy) or alkylthio (preferably lower alkylthio, such as methylthio or ethylthio); and the symbol R' represents hydrogen or acyl (acyl preferably meaning lower alkanoyl, such as acetyl or formyl or propionyl; or benzoyl).

Products of the above formula can be made by novel processes of the invention which comprise as a first step the reaction of a compound of the formula (II)
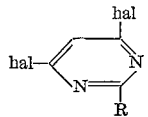

wherein the symbols hal and R have the same significance indicated above, with an alkali salt of a compound selected from the group consisting of sulfanilamide and its $N_4$-acyl derivatives, acyl in this connection signifying preferably lower alkanoyl (such as acetyl, propionyl or formyl) or benzoyl. Preferred embodiments of the alkali salts referred to are represented by alkali metal salts and alkaline earth metal salts.

In addition to the characteristic novel step referred to above, the novel procesess of the invention may optionally include a step of splitting off the $N_4$-acyl substituent, if present in the reaction product; or a step of replacing a nuclear halo substituent in the reaction product by alkoxy or alkyl thio (preferably lower alkoxy or lower alkylthio, as set forth above); or both of these steps, in either sequence desired.

Dihalo compounds of Formula II above can be obtained by reacting 2-alkoxy-4,6-dihydroxy pyrimidine or 2-alkylthio-4,6-dihydroxy pyrimidine with a phosphorus halide (e.g. phosphorus oxychloride) in the presence of a basic material, thus producing the corresponding 2-alkoxy-4,6-dihalo pyrimidine or 2-alkylthio-4,6-dihalo pyrimidine. As to 2,4,6-trihalo pyrimidine compounds, also included within Formula II above, these are generically known substances.

The reaction of the compound of Formula II with alkali salt of sulfanilamide or of its $N_4$-acyl derivative is advantageously effected in a solvent which dissolves the reactant alkali salt at least partially, but which solvent, however, does not itself participate in the reaction. Suitable inert organic solvents for this purpose include such exemplars as dimethylformamide, acetamide and dioxan.

In order to obtain good yields and also to facilitate isolation of pure reaction products, it is advantageous to employ the reactants in the relationship of one molar proportion of compound of Formula II to substantially two molar proportions of alkali salt of sulfanilamide or of its $N_4$-acyl derivative. When the reactants are employed in molar ratios differing materially from those indicated above, both the yield of the reaction product and its purity are adversely affected.

A particularly preferred mode of execution of the processes of the invention comprises: reacting 2-alkoxy-4,6-dihalo-pyrimidine or 2-alkylthio-4,6-dihalo-pyrimidine with an alkali salt as referred to above, for a period of several hours at 80 to 120°, in dimethylformamide or acetamide; digesting the reaction mixture with water; filtering off the thus separated excess sulfanilamide or $N_4$-acyl-sulfanilamide; and isolating from the filtrate 2-alkoxy-4-($N_4$-acyl-sulfanilamido)-6-halo-pyrimidine or 2-alkoxy-4-sulfanilamido-6-halo-pyrimidine or 2-alkylthio-4-($N_4$-acyl-sulfanilamido)-6-halo-pyrimidine or 2-alkylthio-4-sulfanilamido-6-halo-pyrimidine (as the case may be) by acidification. When (for example) 2-methoxy-4,6-dichloro-pyrimidine is reacted with acetylsulfanilamide-sodium, the product obtained, 2-methoxy-4-($N_4$-acetylsulfanilamido)-6-chloropyrimidine, can be treated with alkali metal methylate in methanol under pressure, and then treated with aqueous alkali, thereby replacing the 6-chloro substituent by methoxy and splitting off the $N_4$-acetyl group, to form the known compound 2,6-dimethoxy-4-sulfanilamido-pyrimidine. In similar manner (but, however, omitting the saponification step of treatment with aqueous alkali) one can obtain the said known compound from the reaction product 2-methoxy-4-sulfanilamide-6-chloro-pyrimidine, obtained by reacting 2-methoxy-4,6-dichloro-pyrimidine with sulfanilamide-sodium.

A further advantageous mode of carrying out processes of the invention comprises reacting 2,4,6-trihalo-pyrimidine with $N_4$-acyl-sulfanilamide alkali salt at room temperature in dimethylformamide, treating the reaction mixture with water, precipitating excess acyl-sulfanilamide by means of carbon dioxide and filtering off precipitated acyl-sulfanilamide, and acidifying the filtrate, thereby obtaining 2,6-dihalo-4-($N_4$-acyl-sulfanilamido)-pyrimidine. For example, 2,4,6-trichloro-pyrimidine can be reacted with acetyl-sulfanilamide-sodium, according to this mode of execution, thereby yielding 2,6-dichloro-4-($N_4$-acetyl-sulfanilamido)-pyrimidine. The latter can then be reacted with sodium methylate in methanol at room temperature at ordinary pressures, thereby forming 2-methoxy-4-($N_4$-acetyl-sulfanilamido)-6-chloro-pyrimidine (which can also be formed according to an alternative embodiment of the invention, as already discussed above). The acetyl group can be removed from this product, 2-methoxy-4-($N_4$-acetyl-sulfanilamido)-6-chloro-pyrimidine, by treating the latter with approximately 0.5 N sodium hydroxide solution at about 95–100° for a period of about 1 to 4 hours, thus obtaining an additional novel product of the invention, 2-methoxy-4-sulfanilamido-6-chloro-pyrimidine.

The product 2,6-dichloro-4-($N_4$-acetyl-sulfanilamido)-pyrimidine, obtainable according to the above mode of execution by reacting 2,4,6-trichloro-pyrimidine with acetyl-sulfanilamide-sodium, can be treated with acid in absolute alcoholic solution, whereupon the acetyl group is split off and 2,6-dichloro-4-sulfanilamido-pyrimidine is formed. Advantageously, 2,6-dichloro-4-($N_4$-acetyl-sulfanilamido)-pyrimidine is refluxed for several hours with saturated methanolic hydrogen chloride. The thus formed 2,6-dichloro-4-sulfanilamido-pyrimidine hydrochloride can, if desired, be converted to the free base. The latter can be heated with alkali methylate in methanol under pressure, being thus converted to the known 2,6-dimethoxy-4-sulfanilamido-pyrimidine. On the other hand, by treating 2,6-dichloro-4-sulfanilamido-pyrimidine with alkali methylate in methanol under normal temperature and pressure, only a single chlorine atom is replaced by the methoxy group, and there is formed the above mentioned 2 - methoxy - 4-sulfanilamido-6-chloropyrimidine.

The product 2,6-dichloro-4-($N_4$-acetyl-sulfanilamido)-pyrimidine (obtainable according to the second main mode of carrying out the processes of the invention, by reacting 2,4,6-trichloro-pyrimidine with acetyl-sulfanilamide-sodium) can be converted by heating with alkali methylate in methanol under pressure and then treating with aqueous alkali, directly to the known 2,6-dimethoxy-4-sulfanilamido-pyrimidine. For this purpose it is recommended to heat 2,6-dichloro-4-($N_4$-acetyl-sulfanilamido)-pyrimidine with excess alkali methylate in methanol at temperatures above 100° and under pressure for several hours, then to distill off the alcohol, and to treat the residue with warm aqueous alkali, then to acidify the reaction mixture, thereby precipitating 2,6-dimethoxy-4-sulfanilamido-pyrimidine.

Those novel products of the invention represented collectively by the above Formula I wherein R' represents hydrogen exhibit high activity against pathogenic bacteria. They are useful as chemotherapeutic agents, more particularly as medicinal antibacterial agents; in the same manner generally (as will now be apparent to those skilled in the art) as sulfadimethoxine and similar sulfa drugs.

The invention is further disclosed in the following examples, which are illustrative, but not limitative thereof. Temperatures are stated in the following examples (as elsewhere in the specification) in degrees centigrade.

EXAMPLE I

*2-Methoxy-4,6-Dichloropyrimidine*

A solution of 33 g. of O-methylurea chloride in 100 ml. of absolute methanol is cooled to −8° (bath temperature). A solution of 13.8 g. of sodium in 140 ml. of absolute methanol is added slowly, dropwise, while stirring. Immediately thereafter, 39.6 g. of malonic acid dimethyl ester is quickly added to the reaction mixture. The mixture is allowed to stand for an additional period of 4 hours in the ice bath and then is kept for 3 days at room temperature with precautions to exclude moisture. The crystal mass is filtered off. The filtrate is neutralized with dilute hydrochloric acid and evaporated to dryness in vacuo. The two lots of crystalline material are combined and mixed with 100 ml. of water, and in case of need the mixture is again adjusted to pH 4–5 with dilute hydrochloric acid. The precipitation which takes place is completed by cooling and the precipitate is filtered off and washed with 35 ml. of ice water. The resulting crystalline slurry of 2-methoxy-4,6-dihydroxy-pyrimidine is sucked off, dried in vacuo on a water bath and completely freed of water in a desiccator at 105°. Yield, over 80%; decomposition point, 190° (with bubble formation).

7.2 g. of the finely powdered, dry 2-methoxy-4,6-dihydroxy-pyrimidine is carefully introduced into a mixture of 25 ml. of phosphorus oxychloride and 12.5 ml. of dimethylaniline. The flask is cooled externally in order to avoid too sudden reaction. When evolution of heat has ceased, the reaction mixture is refluxed (using boiling stones), on an oil bath and under a vertical condenser, first for one hour at 105° and then for 1½ hours at 125°. The reaction mixture is cooled, the flask is provided with a descending condenser, and excess phosphorus oxychloride is distilled off at about 50°, in vacuo (12 mm.). The viscous contents of the flask are poured onto ice. Crystals separate. After ½ hour, a layer of ether is poured over the mixture and the mixture is extracted 3 times in a separatory funnel. The combined ethereal extracts are washed twice with water until neutral and dried over sodium sulfate. The ether is distilled off, and the residue is distilled in vacuo. The product 2 - methoxy-4,6-dichloro-pyrimidine passes over at 105°/11 mm. It solidifies in the receiver to a colorless mass of M.P. 59°. Yield, 6.4 g. (70%).

*2-Methoxy-4-($N_4$-Acetylsulfanilamido)-6-Chloro-Pyrimidine*

16.1 g. (2 mols) of $N_4$-acetyl-sulfanilamide-sodium is introduced into 70 ml. of dry dimethylformamide and heated to 130° in an oil bath with occasional shaking. The material dissolves incompletely. The mixture is cooled to 80° and 6.1 g. (1 mol) of 2-methoxy-4,6-dichloro-pyrimidine is introduced while stirring. A fine suspension results. It is heated to 105° and kept at this temperature for 4 hours. Then the dimethylformamide is distilled off in vacuo on a water bath. The syrupy residue is digested with water (about 45 ml.) whereupon excess crystalline $N_4$-acetyl-sulfanilamide separates. The solution exhibits an alkaline reaction. It is allowed to stand for a half hour in the refrigerator and then is sucked off. The filtrate is acidified with glacial acetic acid, whereupon 2 - methoxy - 4 - ($N_4$-acetyl-sulfanilamido)-6-chloro-pyrimidine separates. It precipitates at first in resinous form but then crystallizes to hard pieces, which are triturated in the mother liquor. The white precipitate is sucked off and washed. Yield of crude product, 11.4 g.; M.P. 230°. For purposes of analysis, a portion of the product is dissolved in soda solution and introduced into excess dilute hydrochloric acid. The precipitate is washed and dried and is recrystallized from 80% alcohol, avoiding unnecessarily prolonged heating. M.P. 233°.

EXAMPLE 2

*2,6-Dimethoxy-4-Sulfanilamido-Pyrimidine*

6 g. of 2-methoxy-4-($N_4$-acetyl-sulfanilamido)-6-chloro-pyrimidine (prepared according to Example 1) is heated for 5 hours at 120° in a glass autoclave in an oil bath with a solution of 1.95 g. of sodium (5 mols) in 20 ml. of absolute methanol. Upon cooling, sodium chloride precipitates at the bottom of the vessel. The methanol is distilled off in vacuo and the residue is taken up in 17 ml. of 1 N sodium hydroxide solution and saponified for one hour on a water bath at 90°. A little carbon is added, the mixture is filtered and acidified with glacial acetic acid. Upon filtering off the precipitate there is obtained 4.95 g. of 2,6-dimethoxy-4-sulfanilamido-pyrimidine of M.P. 194–196°. This product is refluxed with a quantity of 96% alcohol which is insufficient for solution, and then the mixture is diluted with water to an alcohol content of about 80%. The mixture is allowed to stand for 12 hours in ice, thus yielding 4.6 g. of purified product of M.P. 202°.

EXAMPLE 3

*2-Methoxy-4-Sulfanilamido-6-Chloro-Pyrimidine*

3 g. of 2-methoxy-4-($N_4$-acetyl-sulfanilamido)-6-chloro-pyrimidine (prepared according to Example 1) is dissolved in 67.2 ml. of 0.5 N sodium hydroxide solution (4 mols) and heated on a water bath for 3 hours at 98° bath temperature. At the end of this time the clear solution is cooled externally with ice water and added dropwise while stirring to a solution of 12 ml. of concentrated hydrochloric acid in 21 ml. of water. White flocks precipitate. The mixture is allowed to stand in the refrigerator for one hour and is sucked off. While cooling with ice and stirring, the filtrate is adjusted to pH 4–5 by dropwise addition of concentrated ammonia. Thereupon 2-methoxy-4-sulfanilamido-6-chloro-pyrimidine precipitates in flocks. The mixture is allowed to stand overnight in the refrigerator, whereupon the precipitate crystallizes. Crude yield, 2.1 g.; M.P. 160–166°. Upon recrystallization from methanol/water, there is obtained 1.85 g. of purified product of M.P. 174°.

EXAMPLE 4

2,6-Dichloro-4-($N_4$-Acetyl-Sulfanilamido)-Pyrimidine 48 g. of dry finely powdered $N_4$-acetyl-sulfanilamide-sodium is suspended in 160 ml. of dimethylformamide and the mixture is cooled to —15°. Then 18.2 g. of 2,4,6-trichloro-pyrimidine is added dropwise within a 10-minute period, while shaking. In spite of external cool- the temperature increases to —5°. While shaking occasionally, the mixture is allowed to stand for one hour at 0° and 30 minutes at 20°, whereupon almost complete solution takes place. The mixture is then poured into 1 liter of water (almost neutral reaction) and is completely neutralized with carbon dioxide. After standing for 2 hours at 0°, the precipitated $N_4$-acetyl-sulfanilamide is filtered off. The filtrate is acidified with dilute hydrochloric acid (10 ml. of concentrated HCl and 40 ml. of water) and kept for 1 to 2 hours at 0°. Upon filtration there is obtained 36 g. of crude 2,6-dichloro-4-($N_4$-acetyl-sulfanilamido)-pyrimidine of decomposition point 238–245° (droplets at 230°). The crude product is dissolved hot in a mixture of 360 ml. of alcohol and 50 ml. of water. Upon cooling to 20° and filtering, there is obtained 30 g. of a product having a decomposition point of 238–240° (residues until 248°). Upon cooling of the mother liquor to 0°, there is obtained an additional 1 gram of the same product. Total yield, 31 g.

EXAMPLE 5

2,6-Dichloro-4-Sulfanilamido-Pyrimidine 30 g. of 2,6-dichloro-4-($N_4$-acetyl-sulfanilamido)-pyrimidine (obtained according to Example 4) is refluxed with a mixture of 150 ml. of absolute methanol and 65 ml. of 8% absolute methanolic hydrogen chloride. After 10 minutes, complete solution has taken place; after 15–20 minutes, new crystallization begins upon vigorous jogging of the reaction mixture. When the mixture has been heated for 110 minutes, it is cooled to 20° and is filtered. There is thus obtained 20 g. of 2,6-dichloro-4-sulfanilamido-pyrimidine hydrochloride of decomposition point 180–200° (67% of theory).

20 g. of the said hydrochloride is covered with sodium bicarbonate solution (200 ml. of water and 10 g. of sodium bicarbonate), whereupon practically all goes into solution, with evolution of carbon dioxide. After filtration, and filtrate is acidified with acetic acid (10 ml of glacial acetic acid and 10 ml of water). The reaction mixture is allowed to stand in ice and then is filtered. There is obtained 17.8 g. of the crude base of M.P. 204–208°. The crude product is dissolved hot in a mixture of 200 ml of alcohol and 15 ml. of water and the clear solution is mixed with 220 ml. of hot water. Upon cooling to 0° and filtering, there is obtained 14.7 g. of purified 2,6-dichloro-4-sulfanilamido-pyrimidine of M.P. 208°. From the mother liquor, upon partial distillation of the alcohol, an additional quantity of 1.2 g. of material can be obtained, having M.P. 199–206°.

EXAMPLE 6

2,6-Dimethoxy-4-Sulfanilamido-Pyrimidine 1.6 g. of 2,6-dichloro-4-sulfanilamido-pyrimidine of M.P. 208° (prepared according to Example 5) is added to 25 ml. of absolute methanol which contains dissolved therein 0.46 g. of sodium. The reaction mixture is heated for 7 hours at 125° (bath temperature) in a glass autoclave. The methyl alcohol is thereupon distilled off in vacuo, and the residue is dissolved in 20 ml. of water. In view of a slight cloudiness, the solution is filtered, then is made congo-acid with dilute hydrochloric acid, whereupon after transient precipitation all goes into solution. The acidic solution is neutralized with ammonia. After drying, there is obtained 1.45 g. of 2,6-dimethoxy-4-sulfanilamido-pyrimidine of M.P. 190–196°. Upon recrystallization from dilute alcohol, the melting point rises to 198–201°.

EXAMPLE 7

2-Methoxy-4-Sulfanilamido-6-Chloro-Pyrimidine 1 g. of 2,6-dichloro-4-sulfanilamido-pyrimidine (prepared according to Example 5) is added to an ice cold solution of 0.33 g. of sodium in 10 ml. of absolute methanol. The clear solution is allowed to stand for one hour at 0° and then is kept for 14 hours at 20° (precipitation of sodium chloride). Then approximately half of the solvent is distilled off in vacuo at 30°, and the residue is mixed with dilute acetic acid (2 ml. of glacial acetic acid plus 20 ml. of water). After standing for one hour at 20°, the crystals which have separated are filtered off. There is thus obtained 0.89 g. of 2-methoxy-4-sulfanilamido-6-chloro-pyrimidine of M.P. 155–170°. Upon recrystallization from methanol, the melting point rises to 171–174°.

EXAMPLE 8

2,6-Dichloro-4-($N_4$-Acetyl-Sulfanilamido)-Pyrimidine 4.8 g. of dry, finely powdered $N_4$-acetyl-sulfanilamide-sodium is suspended in 20 ml. of absolute dioxan and mixed with 1.12 g. of 2,4,6-trichloro-pyrimidine. The reaction mixture is heated to 80° within 20 minutes, while stirring well and taking precautions to exclude moisture. After heating for 1½ hours at 80–85°, the dioxan is distilled off in vacuo, the residue is dissolved in 75 ml. of water and neutralized with carbon dioxide. After standing for one hour at 0°, 2.7 g. of $N_4$-acetyl-sulfanilamide is filtered off. The filtrate, upon acidification, yields 2,6-dichloro-4-($N_4$-acetyl-sulfanilamido)-pyrimidine of M.P. 240–245°.

EXAMPLE 9

2-Methoxy-4-Sulfanilamido-6-Chloro-Pyrimidine 11.64 g. (2 mols) of dry sulfanilamide-sodium is mixed with 20 ml. of dimethylformamide and heated to 100°. The sodium salt remains largely undissolved. While stirring, 5.37 g. of 2-methoxy-4,6-dichloro-pyrimidine is added slowly (in about 15 minutes) to the reaction mixture, with precautions to avoid increase of temperature above 110°. When the reaction has slowed down (lowering of temperature) the still syrupy mixture is allowed to stand for ½ hour on a boiling water bath, with exclusion of moisture. The dimethyl formamide is distilled off in vacuo (12 mm.). The residue is mixed with 40 ml. of water, whereupon excess sulfanilamide separates. The mixture is allowed to stand for ½ hour in the refrigerator and is sucked off. The filtrate is acidified with 50% glacial acetic acid, whereupon 2-methoxy-4-sulfanilamido-6-chloro-pyrimidine precipitates. The precipitate is sucked off, dissolved in soda and again precipitated with 50% acetic acid. Crude yield 8.3 g.; M.P. 169–171°. Upon recrystallization from 20 ml. of methanol, the melting point rises to 172–174°.

In lieu of dimethylformamide, one can also employ 10 g. of acetamide and heat initially to 150°. The sulfanilamide-sodium forms a homogeneous melt with the acetamide. After cooling to 100°, the pyrimidine derivative is then introduced.

EXAMPLE 10

2,6-Dimethoxy-4-Sulfanilamido-Pyrimidine 3 g. of dry 2-methoxy-4-sulfanilamido-6-chloro-pyrimidine (prepared according to Example 6) is heated for 4 hours in a glass autoclave at 120° in an oil bath with a solution of 0.9 g. of sodium in 17 ml. of absolute methanol. Upon cooling, sodium chloride precipitates to the bottom of the vessel. The methanol is distilled off in vacuo and the residue is taken up with 25 ml. of water, whereupon all goes into solution. The solution is acidified with 50% acetic acid, yielding 2.7 g. of crude 2,6-dimethoxy-4-sulfanilamido-pyrimidine of M.P. 201°. Upon recrystallization from 80% ethanol, there is obtained 2.5 g. of purified product having M.P. 202–203°.

EXAMPLE 11

*2-Methylthio-4-Sulfanilamido-6-Chloro-Pyrimidine*

9.6 (2 mols) of dry sulfanilamide-sodium is mixed with 20 ml. of dimethylformamide and heated to 100°, the sodium salt remaining largely undissolved. While stirring, 4.8 g. of 2-methylthio-4,6-dichloro-pyrimidine is added in portions. The sodium salt disappears and a homogeneous syrupy mixture results. After all the pyrimidine reactant has been introduced, the mixture is stirred for an additional period of 15 minutes at 100° and is allowed to stand for 45 minutes on a water bath at 98° in order to complete the reaction. Then the dimethylformamide is distilled off in vacuo (12 mm.). The residue is taken up with 35 ml. of water. Initially all goes into solution, but soon thereafter, upon stirring and scratching with a glass rod, a separation of excess sulfanilamide takes place. After the reaction mixture has remained in the refrigerator for 30 minutes at 0°, the precipitate is sucked off and the filtrate is acidified by dropwise addition of 50% acetic acid. A resinous mass separates, which is isolated and dissolved in aqueous soda solution. Upon renewed acidification with acetic acid, the resin which precipitates is soon converted to a hard crystalline mass, which is triturated in a mortar and then sucked off. The material is crystallized from 10 ml. of methanol, then again from 40 ml. of absolute benzene, in which it is refluxed for 20 minutes. The crystals of 2 - methylthio - 4 - sulfanilamido - 6 - chloro - pyrimidine obtained upon filtration melt at 156–157°. Yield of crude product, 7.4 g. After recrystallization, 5.5 g. The compound is little soluble in water, but on the contrary easily soluble in methanol, ethyl acetate and acetone, and somewhat less easily soluble in ether and benzene. The new compound is also soluble in sodium bicarbonate solution.

EXAMPLE 12

*2,6-Dimethoxy-4-($N_4$-Acetyl-Sulfanilamido)-Pyrimidine*

3.7 g. of 2-methylthio-4-($N_4$-acetyl-sulfanilamido)-6-chloro-pyrimidine is heated for 5 hours at 120° in a glass autoclave in an oil bath with a solution of 1.15 g. of sodium in 20 ml. of absolute methanol. Upon cooling, sodium chloride precipitates. The methanol is distilled off in vacuo and the residue is dissolved in 20 ml. of water. The aqueous solution is acidified with 50% acetic acid, whereupon crystals of 2,6-dimethoxy-4-($N_4$-acetyl-sulfanilamido)-pyrimidine precipitates. Upon recrystallization from methanol, the melting point rises to 222–224°. Yield, 3.2 g.

EXAMPLE 13

*2,6-Dimethoxy-4-Sulfanilamido-Pyrimidine*

1 g. of 2,6-dimethoxy-4-($N_4$-acetyl-sulfanilamido)-pyrimidine (prepared according to Example 12) is dissolved in 10 ml. of 1 N sodium hydroxide solution and heated on a water bath for 2 hours at 58°. Upon acidification with acetic acid, there is obtained 0.75 g. of crude 2,6-dimethoxy-4-sulfanilamido-pyrimidine of M.P. 188–192°. Upon recrystallization from methanol, the melting point rises to 197–199°.

We claim:
1. 2 - lower alkoxy - 4 - ($N_4$-lower alkanoyl-sulfanilamido)-6-halo-pyrimidine.
2. 2-lower alkoxy-4-sulfanilamido-6-halo-pyrimidine.
3. 2 - methoxy - 4-($N_4$-acetyl-sulfanilamido)-6-chloropyrimidine.
4. 2-methoxy-4-sulfanilamido-6-chloro-pyrimidine.
5. A process comprising the steps of reacting 2-lower alkoxy-4,6-dihalo-pyrimidine with an approximately 2 molar proportion of an alkali metal salt of sulfanilamide at a temperature in the range of about 80° to about 120° C., and recovering 2-lower alkoxy-4-sulfanilamido-6-halo-pyrimidine from the resulting reaction mixture.
6. A process according to claim 5 wherein the reaction between the 2-lower alkoxy-4,6-dihalo-pyrimidine and the alkali metal salt of sulfanilamide is carried out in an inert organic solvent which at least partially dissolves the alkali metal salt of sulfanilamide.
7. A process comprising the steps of reacting 2-methoxy-4,6-dichloro-pyrimidine with an approximately 2 molar proportion of sodium sulfanilamide at a temperature in the range of about 80° to about 120° C., and recovering 2 - methoxy - 4-sulfanilamido-6-chloro-pyrimidine from the resulting reaction mixture.
8. A process according to claim 7 wherein said reaction is carried out in the presence of a solvent selected from the group consisting of dimethylformamide, acetamide, and dioxane.

References Cited in the file of this patent
UNITED STATES PATENTS

| | | |
|---|---|---|
| 2,403,776 | Winnek | July 9, 1946 |
| 2,407,966 | Sprague | Sept. 17, 1946 |
| 2,430,439 | Winnek et al. | Nov. 4, 1947 |
| 2,540,356 | Sprague | Feb. 6, 1951 |
| 2,712,012 | Clark | June 28, 1955 |

FOREIGN PATENTS

| | | |
|---|---|---|
| 575,005 | Great Britain | Jan. 30, 1946 |
| 926,131 | Germany | Apr. 7, 1955 |
| 201,595 | Austria | Jan. 10, 1959 |

OTHER REFERENCES

Sprague et al., Journal American Chemical Society, volume 63, pages 3028–30 (1941).

Hackh's Chemical Dictionary published by the Blakiston Company (Philadelphia), 3rd edition, page 18 (1944).

Rose et al., Journal Chemical Society (London), pages 81–85 (1946).

Braker et al., Journal American Chemical Society volume 69, pages 3072–8 (1947).